(12) United States Patent
Badding et al.

(10) Patent No.: US 7,784,287 B2
(45) Date of Patent: Aug. 31, 2010

(54) PULSE DETONATION FIRING DETUNING AND FREQUENCY MODULATED FIRING

(75) Inventors: Bruce John Badding, Ballston Lake, NY (US); Adam Rasheed, Glenville, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1265 days.

(21) Appl. No.: 11/312,409

(22) Filed: Dec. 21, 2005

(65) Prior Publication Data

US 2007/0137616 A1    Jun. 21, 2007

(51) Int. Cl.
*F02C 7/22* (2006.01)
(52) U.S. Cl. .............................. 60/776; 60/39.76; 60/247
(58) Field of Classification Search .................... 60/776, 60/39.76, 39.77, 39.78, 247, 248, 249, 39.38
See application file for complete search history.

(56) References Cited

U.S. PATENT DOCUMENTS

| 2004/0112060 A1* | 6/2004 | Kraft | 60/776 |
| 2005/0138933 A1* | 6/2005 | Tegner | 60/776 |

\* cited by examiner

*Primary Examiner*—Michael Cuff
*Assistant Examiner*—Vikansha S Dwivedi
(74) *Attorney, Agent, or Firm*—Richard A. DeCristofaro

(57) ABSTRACT

An aircraft engine is provided with at least one pulse detonation device, and the operational frequency of the pulse detonation device is varied over an operational range of frequencies around a mean frequency value. The pulse detonation device can be positioned upstream, downstream or adjacent to a turbine section of the engine. An additional embodiment of the present invention is an aircraft engine provided with more than one pulse detonation device, and the operational frequency of one, or more, of the pulse detonation devices is varied over an operational range of frequencies around a mean frequency value.

16 Claims, 1 Drawing Sheet

PULSE DETONATION FIRING DETUNING AND FREQUENCY MODULATED FIRING

BACKGROUND OF THE INVENTION

This invention relates to a method and apparatus for actively varying or modulating the operating frequency of a pulsed detonation combustor in order to avoid exciting natural resonant frequencies of an engine system.

In many applications, and especially in aircraft engines, excessive forced response in propulsion or power conversion equipment is avoided by resonant frequency avoidance. Namely, the driving frequency from some driving force or combustion source is purposely chosen to not coincide with a structural resonance or acoustic resonance, of the surrounding structure. In most cases, the final design of structure or hardware contains a fixed set of natural resonant frequencies. In the design process, one of the objectives is to make sure that these natural resonant frequencies do not coincide with any driving power source frequencies.

In the case of reciprocating engines, axial or centrifugal flow propulsion engines and axial or centrifugal flow power conversion engines the forcing frequency is a function of engine speed. Thus, designers typically avoid operating at speeds where the forcing function and natural frequencies coincide.

With the advent of the use of pulse detonation devices in propulsion applications, particularly aircraft propulsion, this consideration must also be addressed as pulse detonation devices create an impulsive load to the chamber and adjacent components. This load can excite resonant modes in structures. Additionally, fixing the frequency of pulse detonation devices can provide additional coupling to structural resonant tones such that excitation exceeds component damping leading to increased or accelerated component fatigue and/or failure of components and structure.

Up until the advent of the present invention, this problem has not been addressed with pulsed detonation or quasi-detonation combustion sources. For traditional power sources, firing frequencies are fixed to engine operating speeds and structures are chosen to avoid resonance coupling.

SUMMARY OF THE INVENTION

In an embodiment of the present invention, and aircraft engine is equipped with at least one pulse detonation device, and the operational frequency of the pulse detonation device is varied over an operational range of frequencies around a mean frequency value. As discussed previously, since the detonation process, of pulse detonation devices, creates an impulsive load to the chamber and adjacent components, and the impulsive load can excite resonant modes in structures, it is desirable to detune this driving excitation away from acoustic or mechanical resonances. An embodiment of the present invention is operated by detuning sets of pulse detonation devices and/or uses frequency modulation of an individual tube(s) to allow for the decoupling of the pulse detonation device operational frequencies with structural natural resonant frequencies and acoustic frequencies.

Additionally, the frequency modulation of the present invention may be used to aid in reducing the levels of ambient noise during engine operation. Specifically, often during engine operations ambient noise is created which increases the overall sound level of engine operations. In many applications, including aviation, this additional noise is undesirable due to existing noise regulations and the adverse effect it has in passenger comfort. This is especially the case during takeoff and landing operations. The present invention provides a method of active noise cancellation and control.

As used herein, a "pulse detonation device" ("PDD") is understood to mean any combustion device or system where a series of repeating detonations or quasi-detonations within the device cause a pressure rise and subsequent acceleration of the combustion products as compared to the pre-burned reactants. A "quasi-detonation" is a combustion process that produces a pressure rise and velocity increase higher than the pressure rise produced by a deflagration wave. Typical embodiments of PDDs include a means of igniting a fuel/oxidizer mixture, for example a fuel/air mixture, and a confining chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation via cross-firing. The geometry of the detonation chamber is such that the pressure rise of the detonation wave expels combustion products out the PDD exhaust to produce a thrust force or produce power by spinning a downstream turbine. As known to those skilled in the art, pulse detonation may be accomplished in a number of types of detonation chambers, including detonation tubes, shock tubes, resonating detonation cavities and annular detonation chambers.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
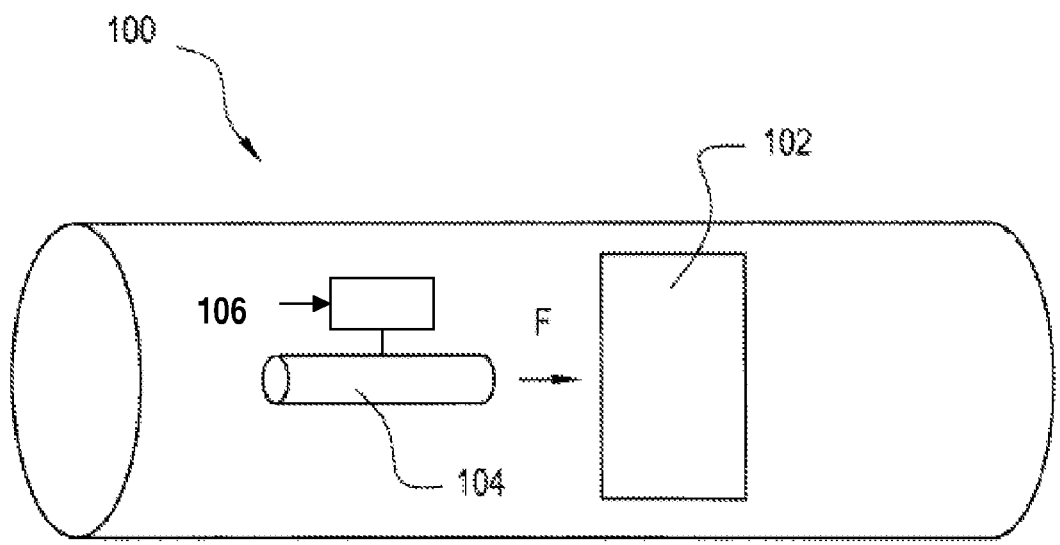
FIG. 1 is a diagrammatical representation of an aircraft engine containing a pulse detonation device, according to one embodiment of the present invention.
Figure 2:
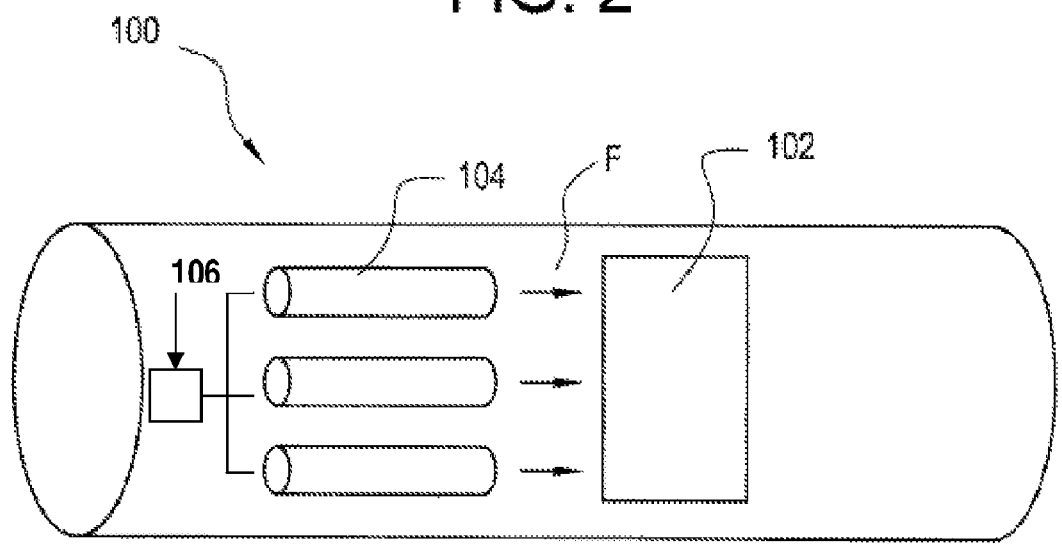
FIG. 2 is a diagrammatical representation of an aircraft engine containing a plurality of pulse detonation devices, according to another embodiment of the present invention.

FIG. 1 is a simplified side view of an aircraft engine 100 containing a pulse detonation device 104, operated according to an embodiment of the present invention. FIG. 2 is a simplified side view of an aircraft engine 100, in accordance with another embodiment of the present invention, containing a plurality of pulse detonation devices 104, operated according to another aspect of the present invention.

Turning now to FIG. 1, an exemplary embodiment of the present invention is shown. In this embodiment an aircraft engine 100 contains a turbine section 102 and a pulse detonation device 104. The pulse detonation device is positioned upstream of the turbine section 102, so that the pulse detonation device 104 acts as a pulse detonation combustor. This configuration allows the pulse detonation device 104 to acts as the engine combustor, where the exhaust F from the pulse detonation device is directed to the turbine 102.

This configuration provides advantages over conventional combustor system due to the efficiency of the combustion when using pulse detonation devices. However, the present invention is not limited to this exemplary embodiment, as in an additional embodiment the pulse detonation device 104 is positioned downstream or adjacent to the turbine section 102.

In the present invention, the pulse detonation device 104 is configured and operated as any known or similar type pulse detonation devices. However, the operational frequency or firing frequency of the pulse detonation device is modulated so as to avoid providing an impulsive load which excites any resonant modes in adjacent structural components.

In the complex structure of aircraft engines, and other propulsion or power generation devices, there are many forcing frequencies which are to be avoided. In particular, it is desirable to avoid natural frequencies of structures, acoustic resonance, blade and disk modes in axial or centrifugal turbines or critical rotor dynamic modes. These, and other critical hardware frequencies, are to be avoided for any extended period of time.

The embodiment of the present invention, shown in FIG. 1, avoids this by operating at a fixed frequency until a critical hardware frequency is approached. As the critical hardware frequency is approached, the operational frequency of the pulse detonation device is changed. The change in frequency can be either step changed or continuously changed.

Additionally and alternatively, the present invention may be used as a method to control ambient noise generated by the engine. Specifically, the frequency modulation of the present application may be used as a means of active ambient noise cancellation or control. To achieve this benefit, the overall operation and construction of the present invention remains the same. However, the frequencies and modulation rates may be varied to achieve the desired affects. The specific frequencies and rates of change for the frequency modulation are to be optimized based on the desired operational characteristics and goals.

For example, in a non-limiting embodiment of the present invention, the mean operational frequency for the pulse detonation device 104 is 200 Hz, and the operational frequency of the device 104 continuously changed, via the device control system 106 between the range of 195 and 205 Hz, in increments of at least 1 Hz. In another embodiment, the range of change can be larger such that the pulse detonation device step-changes between 195, 200 and 205 Hz, at 5 Hz steps. In a further embodiment, the operational frequency is changed in increments of at least 0.1 Hz. In the present invention, the incremental change amount is selected to ensure that there is no excitation of the acoustic or mechanical resonances, and based on the desired operational parameters and specifications.

The specific operational frequencies discussed above are exemplary and the present invention is not limited by these frequencies in any way.

In an alternative embodiment, the operational frequency change of the device 104 can be controlled such that the change is random. In this embodiment, a frequency range is determined (for example between 195 and 200 Hz) and the operational frequency of the device is randomly changed within this range.

In any of the above embodiments, the frequency can be changed after every detonation of the device 104, such that any two consecutive cycles will have a different frequency. In an alternative embodiment, the pulse detonation device 104 can be operated at a frequency for a predetermined period of time or cycles, and then have the operating frequency changed to another frequency for the same period of time or cycles. In this embodiment, the number of cycles or amount of time between cycle changes is to be chosen so as to avoid the creation of any excessive impulsive loads on the structure.

In a further embodiment, the period of time or cycles set at a frequency can be changed randomly between frequency changes. Stated differently, instead of having the same number of cycles (or time) between frequency changes, the amount of time or number of cycles between changes can be changed randomly. Similar to the above embodiment, in this embodiment the frequency changes are controlled such that even though the duration between changes is random, it is controlled so that the longest duration between a change is not to exceed a set period or number of cycles, again to avoid creating any undesirable impulsive loads on the structure.

In the present invention, the control of the firing of the pulse detonation device, and its firing frequency, can be controlled be any commonly known control system.

In FIG. 2, a further embodiment of the present invention is shown. This embodiment is similar to the embodiment shown in FIG. 1 except that the engine 100 contains more than one pulse detonation device 104. Again, the pulse detonation devices are shown upstream of the turbine section 102, to acts as the engine 100 combustor. However, the present invention is not limited to this configuration, and the pulse detonation devices 104 can be located downstream or adjacent to the turbine section.

As with the embodiment shown in FIG. 1, the operating frequencies of the pulse detonation devices 104 are controlled such that their frequencies are changed through an operating range.

In a further embodiment, each of the pulse detonation devices 104 are fired at a fixed frequency which is different from each other so as to detune or spread excitation energy out in the frequency spectrum. This avoids excessive excitation of hardware structure frequencies. Further, in another embodiment, different sets of the devices 104 can be fired at different frequencies. For example, in a configuration with six devices 104, two operate at a first frequency, two others operate at a second frequency and the remaining two operate at a third frequency.

Alternatively, additional embodiments can have active frequency modulation, as discussed above regarding FIG. 1, to provide frequency avoidance control and detuning. In such an embodiment, each of the pulse detonation devices 104 can be controlled so that the frequency changes are random (as discussed with regard to FIG. 1), or can be controlled such systematically (as discussed above regarding FIG. 1). Moreover, in an additional embodiment, the control of the pulse detonation devices 104 is a combination of the random and systematic control methods. In this embodiment, the operational frequency of at least one of the devices 104 is changed/controlled randomly, while the remaining devices 104 are controlled systematically. For example, the remaining devices 104 are controlled such that the operating frequency is changed in 1 Hz increments in the range of 195 Hz to 205 Hz.

In a further embodiment of the present invention, the range of operating frequency of the pulse detonation device 104, or devices (depending on the specific configuration) is changed based on the operating condition of the engine. For example, in a first engine operating condition the operating frequency range of the device 104 is between 195 and 205 Hz, and in a second engine operating condition the operating frequency range of the device 104 is between 165 and 175 Hz.

Although the above discussion has been primarily directed to the use of the present invention in conjunction with aircraft engines, those of ordinary skill in the art will recognize that the present invention may be used with any radial or axial turbine structure, which is driven by a pulse detonation device, and is not limited to only use in aircraft engine applications.

Further, while the invention has been described in terms of various specific embodiments, those skilled in the art will recognize that the invention can be practiced with modification within the spirit and scope of the claims.

What is claimed is:

1. An engine, comprising:
   a first pulse detonation device; and
   a control system operatively coupled to said first pulse detonation device,
   wherein said first pulse detonation device is operated by said control system at a first operational frequency within a first range of operating frequencies in which a first number of pulses are produced by said pulse detonation device over a predetermined period of time, and
   wherein said pulse detonation device is operated by said control system at a second operational frequency within the first range of operating frequencies in which a second number of pulses are produced by said pulse detonation device over the predetermined period of time, the second operational frequency being different than the first operational frequency in such a way so as to prevent resonant excitation of an engine component.

2. The engine of claim 1, wherein said first period of time is different than said second period of time.

3. The engine of claim 1, wherein the difference between the first operational frequency and the second operational frequency is randomly produced by said control system.

4. The engine of claim 1, wherein the difference between the first operating frequency and the second operating frequency is at least 0.1 Hz.

5. The engine of claim 1, wherein the difference between the first operational frequency and the second operational frequency is at least 1 Hz.

6. The engine of claim 1, wherein the at least one pulse detonation device is positioned upstream of a turbine section of said engine.

7. The engine of claim 1, wherein the predetermined period of time is randomly generated by said control system.

8. The engine of claim 1, further comprising a second pulse detonation device operated by said control system within a second range of operational frequencies that is different than the first range of operating frequencies.

9. The engine of claim 8, wherein the first pulse detonation device and the second pulse detonation device are both positioned upstream of a turbine section of said engine.

10. A method of frequency modulation in an engine that includes a pulse detonation device operatively coupled to a control system, said method comprising:
    operating said engine in at least one operating condition;
    operating said pulse detonation device with said engine; and
    modulating said pulse detonation device at a first operational frequency in which a first number of pulses are produced by said pulse detonation device over a predetermined period of time and at second operational frequency in which a second number of pulses are produced by said pulse detonation device over the predetermined period of time, the second operational frequency being different than the first operational frequency in such a way so as to prevent resonant excitation of an engine component.

11. The method of claim 10, wherein said second operational frequency directly follows said first operational frequency.

12. The method of claim 10, wherein the difference between said first operational frequency and said second operational frequency is made randomly made by said control system.

13. The method of claim 10, wherein the difference between the first operating frequency and the second operating frequency is at least 1 Hz.

14. The method of claim 10, wherein the difference between the first operating frequency and the second operating frequency is at least 0.1 Hz.

15. The method of claim 10, further comprising directing an output of said pulse detonation device into a turbine portion of said engine.

16. The method of claim 10, wherein the predetermined period of time is randomly generated by said control system.

* * * * *